United States Patent
Yuan et al.

(10) Patent No.: US 10,964,182 B2
(45) Date of Patent: Mar. 30, 2021

(54) METHODS AND DEVICES FOR ENCODING AND DECODING A SEQUENCE OF IMAGE FRAMES IN WHICH THE PRIVACY OF AN OBJECT IS PROTECTED

(71) Applicant: Axis AB, Lund (SE)

(72) Inventors: Song Yuan, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/721,247

(22) Filed: Dec. 19, 2019

(65) Prior Publication Data

US 2020/0202689 A1   Jun. 25, 2020

(30) Foreign Application Priority Data

Dec. 20, 2018   (EP) ..................................... 18214316

(51) Int. Cl.
*G08B 13/196* (2006.01)
*G06K 9/00* (2006.01)

(52) U.S. Cl.
CPC ... *G08B 13/19686* (2013.01); *G06K 9/00771* (2013.01); *G08B 13/19604* (2013.01)

(58) Field of Classification Search
CPC .......... G06K 9/00771; G08B 13/19604; G08B 13/19686; H04N 19/132; H04N 19/187; H04N 19/29; H04N 19/30; H04N 19/48; H04N 19/50; H04N 19/65; H04N 19/70; H04N 21/4318; H04N 5/23229
See application file for complete search history.

(56) References Cited

U.S. PATENT DOCUMENTS

2004/0179712 A1   9/2004  Roelofsen et al.
2008/0117295 A1   5/2008  Ebrahimi et al.
(Continued)

FOREIGN PATENT DOCUMENTS

| EP | 2874396 A1 | 5/2015 | |
| FR | 2972886 A1 | 9/2012 | |
| FR | 2972886 A1 * | 9/2012 | ....... H04N 21/23476 |

OTHER PUBLICATIONS

Panasonic Business, "You Can Protect Your Business by Protecting Privacy," Privacy Protection Solution by People Masking (2016).
(Continued)

*Primary Examiner* — Dakshesh D Parikh
(74) *Attorney, Agent, or Firm* — Volpe Koenig

(57) ABSTRACT

A method encodes a sequence of image frames depicting an object whose privacy is to be protected. A first and a second version of the sequence of image frames is generated. Image frames of the first version, but not the second version, of the sequence are provided with a privacy mask to protect the privacy of the object depicted therein. The first version of the sequence is encoded as a first encoded sequence of intra-coded image frames and inter-coded image frames. A second version of the sequence is encoded as a second encoded sequence of inter-coded image frames. The inter-coded image frames of the second encoded sequence are encoded by using the intra-coded image frames of the first encoded sequence. The inter-coded image frames of the second encoded sequence are encrypted, and thereafter the first and the second encoded sequence are merged into a single output sequence.

10 Claims, 5 Drawing Sheets

(56) References Cited

U.S. PATENT DOCUMENTS

| | | |
|---|---|---|
| 2015/0049912 A1 | 2/2015 | Migdal et al. |
| 2016/0295219 A1 | 10/2016 | Ye et al. |
| 2016/0337673 A1 | 11/2016 | Agthe et al. |
| 2017/0076572 A1 | 3/2017 | Rao |

OTHER PUBLICATIONS

Schwarz et al., "Overview of the Scalable Video Coding Extension of the H.264/AVC Standard," in IEEE Transactions on Circuits and Systems for Video Technology, vol. 17, No. 9, pp. 1103-1120, (Sep. 2007).

Extended European Search Report dated Jun. 28, 2019 for the European Patent Application No. 18214316.4.

* cited by examiner

METHODS AND DEVICES FOR ENCODING AND DECODING A SEQUENCE OF IMAGE FRAMES IN WHICH THE PRIVACY OF AN OBJECT IS PROTECTED

TECHNICAL FIELD

The invention relates to the field of video encoding and decoding. In particular, it relates to encoding and decoding of a sequence of image frames depicting an object whose privacy is to be protected.

BACKGROUND

Video cameras are commonly used for surveillance of public areas such as shops, parking lots, railway stations, etc. The captured videos may advantageously be used to protect the safety of ordinary people. However, a disadvantage with the captured videos is that they may violate the integrity of the persons depicted therein. Recently, efforts have been made, via regulations, to protect the integrity of people by restricting personal data that may be collected and stored. Such personal data includes videos from which a person may be identified.

Video camera manufacturers have come up with various solutions which allow the privacy of people, or other objects, to be protected in a captured video. A common approach is to analyse the video to find objects that should protected. The objects may be faces, persons, screens, cars, etc. These objects are then covered by so-called privacy masks which make it impossible to identify the objects from the video. However, when an incident occurs, it is still desirable that authorised users, such as police or dedicated security staff, are able to watch the video without privacy masks to be able to identify perpetrators, victims, and witnesses. Accordingly, ordinary users should only be allowed to watch the privacy masked video and authorised users should be able to watch the un-masked video. An ordinary user may be security staff member while an authorised user may be a police officer who investigates a reported incident, a dedicated senior security staff member, or a security staff member which has gone through security training for handling specific incidents.

To fulfil that requirement, the video camera may produce two separate streams from the captured video. In a first stream objects may be provided with privacy masks, while in a second stream no privacy masks are provided. To prevent unauthorized users from watching the second stream, it may be encrypted such that it only can be watched by users in possession of the encryption key.

The approach with two separate streams has several drawbacks. For example, having two streams instead of one has a negative impact on the bitrate and requires more storage space at the receiving end. Further, the two separate streams belong together as a pair, and efforts have to be made to keep the association between the two separate streams during handling at the receiving end. For instance, such efforts need to be made during storage of the two streams. Further, the video management system at the receiving end would have to be specifically designed to receive two separate streams instead of one, which is usually the case. Typically, a video management system is used to handle video from cameras which may have a large variety of different setups. There may be a few video management systems which support receiving separate streams, but most of the available video management systems are only designed to handle a single stream. There is thus room for improvements.

SUMMARY

Mitigating the above drawbacks and still providing a video which allows authorised users to watch the original video, while ordinary users only are allowed to watch a privacy masked video would be desirable.

According to a first aspect, a method for encoding a sequence of image frames depicting an object whose privacy is to be protected, comprises:

receiving a sequence of image frames to be encoded, wherein the sequence of image frames depicts an object whose privacy is to be protected;

generating a first and a second version of the sequence of image frames, wherein the image frames of the first version, but not the second version, of the sequence are provided with a privacy mask to protect the privacy of the object depicted in the sequence of image frames;

encoding the first version of the sequence of image frames as a first encoded sequence of intra-coded image frames and inter-coded image frames;

encoding the second version of the sequence of image frames as a second encoded sequence of inter-coded image frames, wherein the inter-coded image frames of the second encoded sequence are encoded by using the intra-coded image frames of the first encoded sequence;

encrypting the inter-coded image frames of the second encoded sequence; and merging the first and the second encoded sequence into a single output sequence by interleaving image frames of the first and the second encoded sequence.

The depicted object may be one or more stationary or moving objects. The reason why the privacy of the object is to be protected may be due to regulations, such as the EU General Data Protection Regulation.

As used herein, a privacy mask is an electronically applied mask which restricts a certain area from view. In that way, the restricted area remains private.

As used herein, an intra-coded frame refers to an image frame which is encoded by only making reference to itself. The intra-coded frame is therefore self-contained. Intra-coded frames are also known as I-frames.

As used herein, an inter-coded frame refers to an image frame which is encoded by making reference to one or more other image frames. The one or more other image frames are typically decoded versions of previously encoded frames, such as previously intra-coded frames or previously inter-coded frames. Examples of inter-coded frames are P-frames and B-frames.

Prior to encoding, different types of processing may be carried out on the received sequence of image frames. As a result of the processing, a first and a second version of the sequence of image frames are generated. As used herein, a version of a received sequence of image frames hence refers to a sequence of image frames which is derived from, or generated on basis of, the received sequence of image frames. A version of a sequence of image frames may be identical to the sequence of image frames. However, it may also be different from the sequence of image frames. For example, the first version of the received sequence of image frames is different from the received sequence of image frames, since objects are shielded by privacy masks in the first version. The second version of the received sequence of image frames is in some embodiments identical to the received sequence of images frames. In other embodiments, the second version may be a modified version of the received sequence of image frames.

With this arrangement, two versions of the image sequence are processed. In a first version of the sequence, the depicted object to be protected is provided with a privacy mask. The first version and the second version are then encoded. However, the two versions are not encoded independently of each other. In more detail, no separate intra-coded frames are encoded for the second version (the version without the privacy masks). Instead, the second version shares the intra-frames of the encoded first version. Specifically, the second version is encoded using only inter-coded frames. These inter-coded frames are encoded taking the intra-coded frames of the encoded first version as a starting point. In this way, no intra-coded frames are encoded for the second version. As intra-coded frames are significantly more expensive in terms of bitrate than inter-coded frames, the total bitrate of the encoded first and second version of the image sequence is significantly lower compared to encoding the two versions independently of each other. Tests have shown that this may result in a 30% reduction of the total bitrate. To further reduce the bitrate, a higher compression could be used when encoding the first version of the sequence of image frames (the version with a privacy mask) than when encoding the second of the sequence of image frames (the version without privacy mask). By design, the version with privacy masks has fewer details which are of interest from a surveillance point of view and may therefore be more compressed.

After encoding, the encoded second version of the image sequence is encrypted. In that way, only authorized users will be able to watch the protected object in the encoded second version.

Further, a single stream—the single output sequence—is provided as output instead of two separate streams. In the single stream, encoded frames which include privacy masks, and encrypted encoded frames which do not include privacy masks are combined by interleaving. Hence, the receiving end neither has to be specifically adapted to receive two separate streams nor does it have to handle two separate streams as a pair.

The image frames of the second encoded sequence may be hidden in the output sequence. This may be achieved by providing the inter-coded image frames of the second encoded sequence with an indication which prevents them from being decoded by a standardized image decoder. In this way, a standardized decoder may disregard the image frames of the second encoded sequence and will hence only decode the intra-coded and inter-coded frames of the first encoded sequence. Thus, a standardized decoder will decode the version of the image sequence where the object is protected by means of a privacy mask. However, in order to decode the hidden image frames, a customized decoder is required.

By a standardized decoder is meant a decoder which is configured to decode video which is of a standardized video coding format. H.264/AVC/MPEG-4 Part 10 and H.265/HEVC/MPEG-H Part 2 are examples of such standards.

The indication may be provided in headers of the inter-coded image frames of the second encoded sequence. In this way, a decoder may easily access the information without having to decode the frames.

The indication may be implemented in different ways, e.g., by setting a flag in a header. A convenient way to indicate the hidden image frames is to make use of bits or bit combinations in the header that, according to the standard at hand, are unspecified. For example, in the H.264 and H.265 standards, the network abstraction layer (NAL) units are provided with header information which includes the type of the NAL unit. The indication may be provided by setting a value of the NAL, unit type of NAL units associated with the inter-coded image frames of the second encoded sequence. The value may be set to indicate that the NAL units should not be decoded by a standardized decoder. Thus, by providing the indication in this way, a standardized decoder will automatically disregard the inter-coded image frames associated with the NAL unit. A customized decoder may however be specifically designed to identify these inter-coded frames based on the indication.

As explained above, a standardized decoder may disregard the inter-coded frames of the second encoded sequence while a customized decoder instead may identify and decode the inter-coded frames of the second encoded sequence. Since the second encoded sequence shares the intra-coded frames with the first encoded sequence, a customized decoder needs to decode the intra-coded frames of the first encoded sequence in order to decode the inter-coded frames of the second encoded sequence. However, the decoded intra-coded frames of the first encoded sequence should not be displayed at the customized decoder since they include the privacy mask (the role of the customized decoder is to decode a sequence without the privacy mask).

There are several ways of avoiding that the intra-coded frames of the first encoded sequence are displayed at the customized decoder.

In a first approach, the customized decoder is specifically designed to not include intra-coded frames in the final decoded sequence which is intended for display.

In a second approach, the intra-coded frame of the first encoded sequence are, during encoding, provided with an indication that they should not be displayed. In that way, the customized decoder will not show the intra-coded frames. However, a drawback of that approach is that also the standardized decoder will not show the intra-coded frames. To deal with that drawback, the method may further comprise adding, to the first encoded sequence, an empty inter-coded image frame after each of the intra-coded image frames. When decoded and displayed, the empty inter-coded image frames will show up as a copy of the intra-coded image frames.

The sequence of image frames may depict different types of objects whose privacy is to be protected. For example, one type of objects may be persons, another type may be license plates, and yet another type may be specific buildings. In another example, one type of objects is a first category of persons (such as customers in a shop) and another type of objects is a second category of persons (such as staff in a shop). In such a situation, the image frames of the first version of the sequence may be provided with privacy masks to protect the privacy of all types of objects whose privacy is to be protected, and the image frames of the second version of the sequence may be provided with privacy masks to protect the privacy of all but a first type of objects whose privacy is to be protected. This allows for giving a user authorization to see a first type of objects, but not the other types of objects.

The above approach may be extended so as to allow for giving different users authorization to different object types. More specifically, the method may further comprise:

generating a third version of the sequence of image frames, wherein the image frames of the third version of the sequence are provided with privacy masks to protect the privacy of all but a second type of objects whose privacy is to be protected;

encoding the third version of the sequence of image frames as a third encoded sequence of inter-coded image frames, wherein the inter-coded image frames of the third encoded sequence are encoded by using the intra-coded image frames of the first encoded sequence, encrypting the inter-coded image frames of the third encoded sequence; and merging the third encoded sequence with the first and the second encoded sequence into the single output sequence by interleaving image frames of the first, the second, and the third encoded sequence.

With this approach, a third version of the sequence of image frames is generated. In the third version, privacy masks are provided to protect the privacy of all objects but a second type of objects. The third version of the sequence is then encoded in a similar way as the second version of the sequence, by using the intra-coded frames of the first encoded sequence. From the image frames of the second encoded sequence, an authorized user may decrypt, decode, and display objects of the second type. From the image frames of the third encoded sequence, an authorized user may decrypt, decode, and display objects of the third type.

The second encoded sequence typically only includes inter-coded image frames. These inter-coded image frames may be arranged in sub-sequences of successive inter-coded image frames. A sub-sequence may be encoded by using an intra-coded image frame of the first encoded sequence as a starting point for the encoding. For example, a first inter-coded frame of a sub-sequence may be encoded with reference to a decoded version of the intra-coded image frame. The next inter-coded frame of the sub-sequence may be encoded with reference to a decoded version of the first inter-coded image frame, and so on.

According to a second aspect, there is provided a device for encoding a sequence of image frames depicting an object whose privacy is to be protected, comprising:

a receiver configured to receive a sequence of image frames to be encoded, wherein the sequence of image frames depicts an object whose privacy is to be protected;

a privacy masker configured to generate a first version of the sequence of image frames, wherein the image frames of the first version of the sequence are provided with a privacy mask to protect the privacy of the object depicted in the sequence of image frames;

an encoder configured to encode the first version of the sequence of image frames as a first encoded sequence of intra-coded image frames and inter-coded image frames, and to encode a second version of the sequence of image frames as a second encoded sequence of inter-coded image frames, wherein the image frames of the second version of the sequence of image frames are not provided with a privacy mask to protect the privacy of the object depicted in the sequence of image frames, and wherein the inter-coded image frames of the second encoded sequence are encoded by using the intra-coded image frames of the first encoded sequence;

an encrypter configured to encrypt the inter-coded frames of the second encoded sequence; and an interleaver configured to merge the first and the second encoded sequence into a single output sequence by interleaving image frames of the first encoded sequence and the second encoded sequence.

According to a third aspect, there is provided a camera comprising:

an image sensor configured to capture a sequence of image frames depicting an object whose privacy is to be protected, and a device according to the second aspect which is arranged to receive the sequence of image frames captured by the image sensor and to encode the received sequence of image frames into a single output sequence.

According to a fourth aspect, there is provided a (non-transitory) computer-readable medium having computer-code instructions stored thereon which, when executed by a processor, are adapted to carry out the method of the first aspect.

The second, third, and fourth, aspects may generally have the same features and advantages as the first aspect.

According to a fifth aspect, there is provided a method for decoding an encoded sequence of image frames in which the privacy of an object is protected, comprising:

receiving an encoded sequence of image frames, wherein the encoded sequence of image frames comprises interleaved image frames of a first and a second encoded sequence of image frames, wherein the second encoded sequence of image frames includes inter-coded image frames which are encoded by using intra-coded image frames of the first encoded sequence, wherein the privacy of the object is protected by privacy masks in the image frames of the first encoded sequence, and by encryption in the second encoded sequence;

extracting, from the encoded sequence of image frames, the intra-coded image frames of the first encoded sequence and the inter-coded image frames of the second encoded sequence, decrypting the inter-coded image frames of the second encoded sequence, decoding the intra-coded frames of the first encoded sequence and the decrypted inter-coded image frames of the second encoded sequence, wherein the decrypted inter-coded image frames are decoded by using the decoded intra-coded frames of the first encoded sequence; and forming a decoded sequence for display from the decoded, decrypted, inter-coded image frames of the second encoded sequence.

The above decoding method may be performed in a customized decoder. The customized decoder may accordingly decode the intra-coded frames of the first encoded sequence and the inter-coded frames of the second encoded sequence. However, the customized decoder only includes the decoded inter-coded frames in the resulting sequence for display.

As explained above, the inter-coded image frames of the second encoded sequence may be provided with an indication which prevents them from being decoded by a standardized decoder. In the step of extracting, the indication may be used to identify the inter-coded image frames in the encoded sequence of image frames. The indication thus signals to the decoder which frames to extract from the received encoded sequence.

The frames in the received encoded sequence are associated with time stamps which indicate time pointe for their display. Specifically, the intra-coded frames of the first encoded sequence and the inter-coded image frames of the second encoded sequence are provided with time stamps which indicate time points for their display. However, since the decoder does not include the intra-coded frames in the display sequence, there will be a gap between the time stamps in the display sequence where the intra-coded frame should have been. To deal with that problem, the method may further comprise adjusting the time stamps of the inter-coded images frames of the second encoded sequence so as to compensate for the intra-coded frames of the first encoded sequence not being included in the decoded sequence for display.

According to a sixth aspect, there is provided a device for decoding an encoded sequence of image frames in which the privacy of an object is protected, comprising:

a receiver configured to receive an encoded sequence of image frames, wherein the encoded sequence of image frames comprises interleaved image frames of a first and a second encoded sequence of image frames, wherein the second encoded sequence of image frames includes inter-coded image frames which are encoded by using intra-coded image frames of the first encoded sequence, wherein the privacy of the object is protected by privacy masks in the image frames of the first encoded sequence, and by encryption in the second encoded sequence;

a frame extractor configured to extract, from the encoded sequence of image frames, the intra-coded image frames of the first encoded sequence and the inter-coded image frames of the second encoded sequence, a decrypter configured to decrypt the inter-coded image frames of the second encoded sequence, a decoder configured to decode the intra-coded frames of the first encoded sequence and the decrypted inter-coded image frames of the second encoded sequence, wherein the decrypted inter-coded image frames are decoded by using the decoded intra-coded frames of the first encoded sequence; and to form a decoded sequence for display from the decoded, decrypted, inter-coded image frames of the second encoded sequence.

The sixth aspect may generally have the same features and advantages as the fifth aspect. It should be noted that all possible combinations set forth herein are possible unless explicitly stated otherwise.

BRIEF DESCRIPTION OF THE DRAWINGS

The above features will be better understood through the following illustrative and non-limiting detailed description of embodiments, with reference to the appended drawings, where the same reference numerals will be used for similar elements, wherein.

DETAILED DESCRIPTION OF EMBODIMENTS

Figure 1:
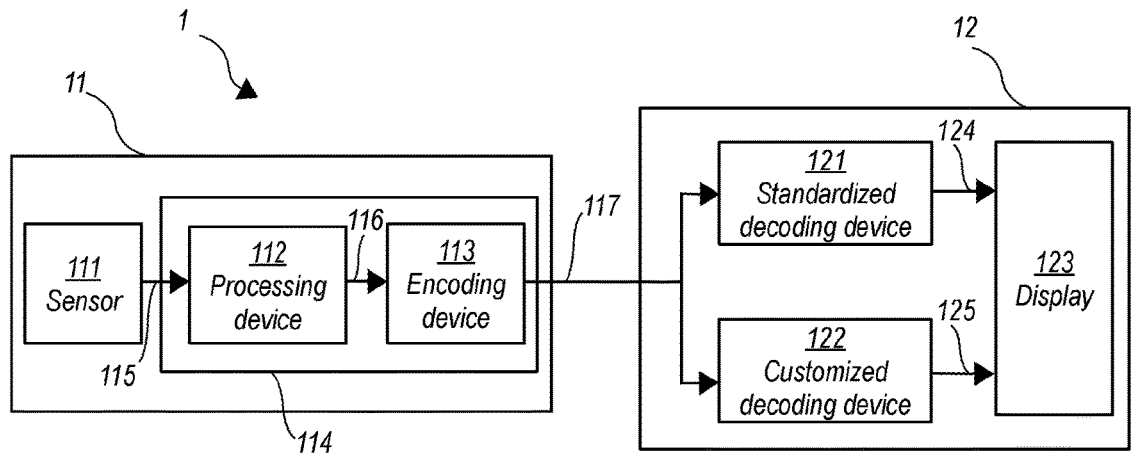
FIG. 1 schematically illustrates a system in which embodiments may be implemented.

FIG. 1 illustrates a system 1 comprising a video camera 11 and a client device 12. The video camera 11 is arranged to communicate with the client device 12, for example via a wired or wireless network. The video camera 11 may be a monitoring camera.

The camera 11 comprises an image sensor 111, and an encoding device 113. The camera 11 may also comprise a processing device 112. The processing device 112 and the encoding device 113 may be part of an image processing pipeline 114 of the camera 11.

The image sensor 111 is arranged to capture a sequence of image frames 115, i.e., a video. The sequence of image frames 115 may depict one or more objects whose privacy is to be protected. For example, the depicted one or more objects may be a person, a license plate of a car, a building, a sign, etc.

The image sensor 111 may forward the sequence of image frames 115 to the processing device 112 of the image processing pipeline 114 where it is subject to image processing as is known in the art. As a result of the processing, the processing device 112 provides a processed sequence of image frames 116 to the encoding device 113.

The encoding device 113, which will be described in more detail below, receives the sequence of image frames 116 and encodes it into a single output sequence 117 of encoded image frames. In brief, the output sequence 117 includes both encoded image frames in which the one or more objects are protected by means of privacy masks, and encoded image frames in which the one or more objects are protected by means of encryption.

The client device 12 may comprise a standardized decoding device 121, a customized decoding device 122, or both. The standardized decoding device 121 is compliant with a standard, such as H.264 or H.265, and decodes video following the specification of the standard at hand. In contrast, the customized decoder 122 is specifically designed to decode the encoded sequence of image frames 117 which includes both encoded image frames in which the one or more objects are protected by means of privacy masks, and encoded image frames in which the one or more objects are protected by means of encryption.

The client device 12 may also comprise a display 123 for displaying decoded video. Alternatively, the client device 12 may send decoded video to an external display.

The standardized 121 and/or customized 122 decoding device receives the encoded sequence of image frames 117. As will be explained in more detail below, the standardized decoding device 121 disregards the encoded image frames in which the one or more objects are protected by means of encryption. Instead, it will decode image frames in which the one or more objects are protected by means of privacy masks. Accordingly, the standardized decoding device 121 only decodes the image frames in which the one or more objects are protected by privacy masks. Thus, the standardized decoding device 121 produces a decoded sequence of image frames 124 in which the one or more objects are protected by privacy masks. In contrast, the customized decoding device 122 produces a decoded sequence of image frames 125 in which the one or more objects are visible.

Figure 2:
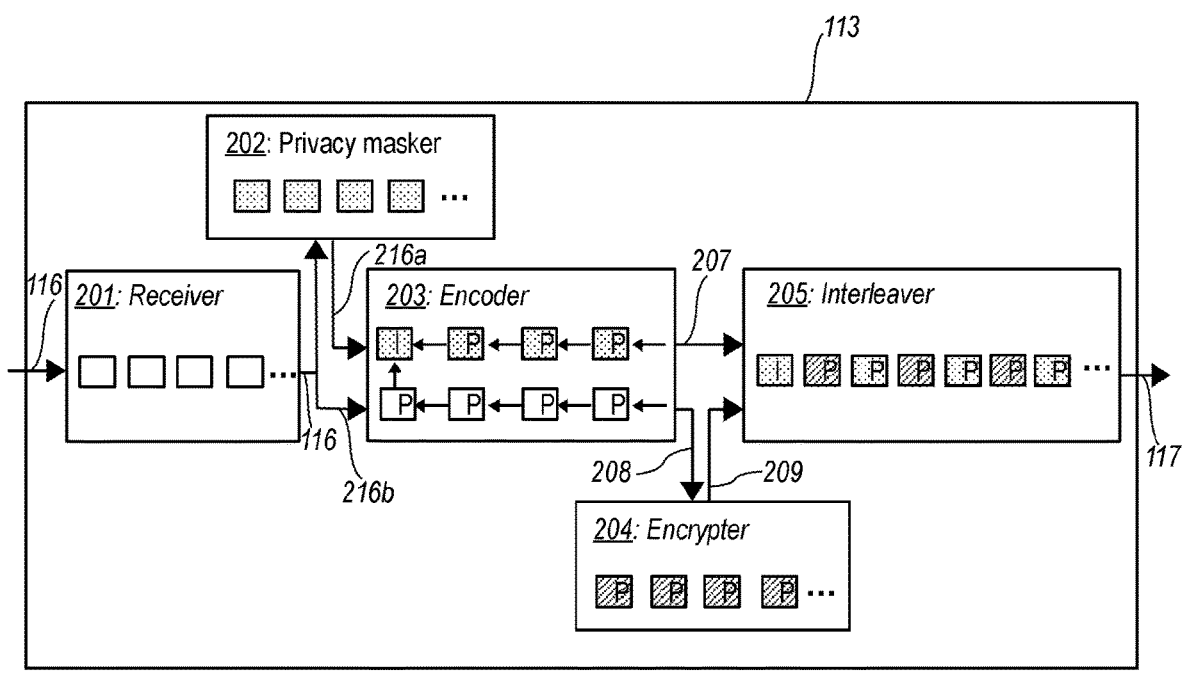
FIG. 2 schematically illustrates an encoding device according to embodiments.

The encoding device 113 is illustrated in more detail in FIG. 2. It comprises a receiver 201, a privacy masker 202, an encoder 203, an encrypter 204, and an interleaver 205.

The encoding device 113 thus comprises various components 201, 202, 203, 204, 205 which are configured to implement the functionality of the device 113. In particular, each illustrated component corresponds to a functionality of device 113. Generally, the device 113 may comprise circuitry which is configured to implement the components 201, 202, 203, 204, 205 and, more specifically, their functionality.

In a hardware implementation, each of the components 201, 202, 203, 204, 205 may correspond to circuitry which is dedicated and specifically designed to provide the functionality of the component. The circuitry may be in the form of one or more integrated circuits, such as one or more application specific integrated circuits or one or more field-programmable gate arrays. By way of example, the encoder 203 may thus comprise circuitry which, when in use, encodes the first and the second version of the sequence of image frames.

In a software implementation, the circuitry may instead be in the form of a processor, such as a microprocessor, which in association with computer code instructions stored on a (non-transitory) computer-readable medium, such as a non-volatile memory, causes the device 104 to carry out any method disclosed herein. Examples of non-volatile memory include read-only memory, flash memory, ferroelectric RAM, magnetic computer storage devices, optical discs, and the like. In a software case, the components 201, 202, 203, 204, 205 may thus each correspond to a portion of computer code instructions stored on the computer-readable medium, that, when executed by the processor, causes the device 113 to carry out the functionality of the component.

It is to be understood that it is also possible to have a combination of a hardware and a software implementation, meaning that the functionality of some of the components 201, 202, 203, 204, 205 are implemented in hardware and others in software.

Figure 3:
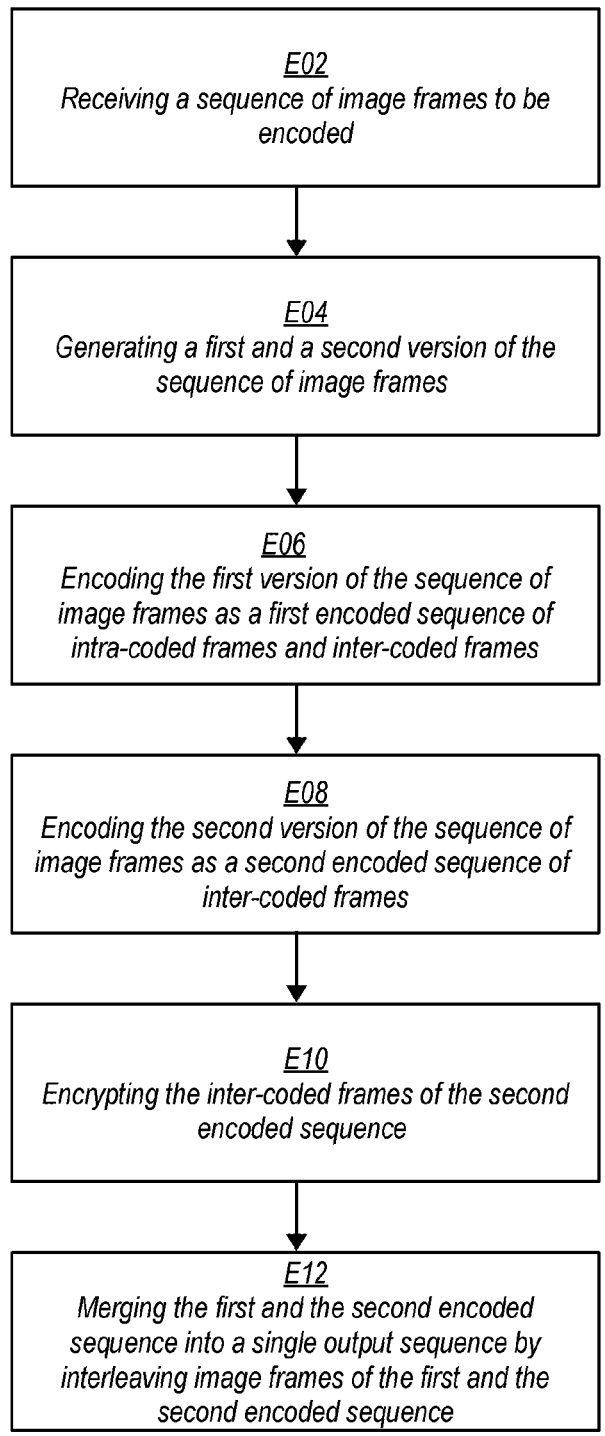
FIG. 3 is a flowchart of an encoding method according to embodiments.

The operation of the encoding device 113 when encoding a sequence of image frames depicting an object whose privacy is to be protected will now be described with reference to FIG. 2 and the flow chart of FIG. 3.

In step E02, the receiver 201 receives the sequence of image frames 116. The image frames of the sequence of image frames 116 are received sequentially, and the encoding device 113 processes the image frames one after the other as they are received. The sequence of image frames is illustrated as a sequence of white boxes in the receiver block 201.

The receiver 201 forwards the sequence of image frames 116 to the privacy masker 202. The privacy masker 202, in step E04, generates a first version 216*a* of the sequence of image frames 216. In the first version 216*a* of the sequence, the image frames are provided with one or more privacy masks to protect the one or more objects which are depicted in the image frames of the received sequence 116. In order to do so, the privacy masker 202 may first detect the one or more objects whose privacy is to be protected in the image frames of the received sequence 116. For that purpose, the privacy masker 202 may use any known method for object detection. For example, if the one or more objects are human beings, any known method for detecting human beings in an image may be used. In case the one or more objects are moving objects, the privacy masker 202 may use motion detection or tracking methods which allows objects to be detected by studying motion between image frames in the received sequence of image frames 116.

By way of example, the privacy masker 202 may store, or have access to, a background image. The background image depicts the background in the scene without any foreground objects. The privacy masker 202 may detect the one or more objects in an image frame of the sequence 116 by comparing the image frame to the background image. In that way, the privacy masker 202 may identify those pixels in the image frame that correspond to the one or more objects. The privacy masker 202 may further update the background image on basis of the image frame of the sequence 116. For example, the privacy masker 202 may form a weighted average of pixels in the background image and pixels in the image frame that do not correspond to the one or more objects. The updated background image may then be used when detecting the one or more objects in the subsequent image frame in the sequence 116.

Once one or more objects have been detected, the privacy masker 202 may generate the first version 216*a* of the image sequence by concealing the one or more objects in the image frames of the sequence 116 by using one or more privacy masks. Alternatively, the privacy masker 202 may generate the first version 216*a* of the image sequence by adding one or more privacy masks to the background image that was used to detect the one or more objects. The privacy masks may be added to cover pixel positions corresponding to the detected one or more objects.

A privacy mask may generally be anything that prevents an object from being viewed. It may be used to replace or cover image data corresponding to an object. A privacy mask may, for example, add a uniform colour to the area so that no detail of the covered object can be seen. Alternatively, the mask may blur or pixelate the area of the image so as to prevent any fine details to be seen. The privacy mask may be solid, such that the scene cannot be seen through the mask. The privacy mask may have the shape of a rectangle. Preferably, however, the privacy mask follows a contour of the object to allow movements such as gestures, or poses, of the object to be seen. For example, it allows a user to see how many persons there are within a certain area, whether the persons are running, fighting, or behave aggressively. In case the privacy mask is added to the background image, the privacy mask may be transparent to let the background behind the object shine through the mask.

The privacy masker 202 forwards the first version 216*a* of the sequence of image frames to the encoder 203. The first version 216*a* of the sequence of image frames is illustrated as a sequence of boxes with dotted pattern in the privacy mask block 202.

The receiver 201 further forwards the received sequence of image frames 116 to the encoder 203 as a second version 216*b* of the sequence of image frames. In the embodiment of FIG. 2, the second version 216*b* of the sequence of image frames is hence identical to the received sequence of image frames 116. The encoding device 113, in step E04 hence generates a second version 216*b* of the received sequence of image frames 116 which is identical to the received sequence of image frames 116.

The encoder 203 then, in step E06, encodes the first version 216*a* of the sequence of image frames to produce a first encoded sequence 207. The encoder 203 encodes the image frames in the first version 216*a* of the sequence using intra-coded frames (I-frames) and inter-coded frames (P-frames and/or B-frames), e.g., in accordance with the H.264 of the H.265 standard. The image frames may be encoded as successive group of pictures, GOPs, which prescribe which frames should be intra-coded and which frames should be inter-coded. Typically, each GOP starts by an intra-coded frame followed by a sequence of one or more inter-coded frames. By way of example, a part of a GOP of the first encoded sequence 207 is illustrated at the top in the encoder block 203. The first frame in the GOP is intra-coded (denoted by an I), the second frame is inter-coded (denoted by an P) with reference to the intra-coded frame, the third frame is inter-coded with reference to the second frame, and so on.

The encoder 203 further, in step E08, encodes the second version 216b of the sequence of image frames as a second encoded sequence 208. The second encoded sequence 208 includes only inter-coded image frames. When encoding the second version 216b of the sequence, the encoder 203 makes use of the intra-coded frames of the first, privacy masked, version 206 of the sequence. The second encoded sequence 208 includes sub-sequences of successive inter-coded image frames. Each of these sub-sequences is associated with an intra-coded frame in the first encoded sequence 207. The intra-coded frame in the first encoded sequence 207 is used as a starting point, i.e., as a start reference frame, for encoding of the associated sub-sequence of frames of the second encoded sequence 208. The intra-coded frame in the first encoded sequence 207 is used as a reference frame for the first inter-coded frame in the associated sub-sequence of the second encoded sequence 208 but may also be used as a reference frame for sub-sequent inter-coded frames in the associated sub-sequence of the second encoded sequence 208. A sub-sequence of inter-coded frames of the second encoded sequence 208 is illustrated at the bottom of the encoder block 203. The illustrated sub-sequence is associated with the intra-coded frame of the GOP shown at the top of the encoder block 203. A first inter-coded frame of the sub-sequence is encoded with reference to the intra-coded frame, while subsequent inter-coded frames of the sub-sequence are encoded with reference to the previous frame in the sub-sequence.

It should be noted that an intra-coded frame of the first encoded sequence 207 and the first inter-coded frame of a sub-sequence associated with the intra-coded frame corresponds to the same frame in the captured video. The difference between the two is that objects are masked in the first, while not in the other. Accordingly, by referring back to the intra-coded frame, the only information carried by the inter-coded frames of the second encoded sequence is the one or more objects which are privacy masked in the first encoded sequence.

The encoder 203 forwards the first encoded sequence 207 to the interleaver 205, and the second encoded sequence 208 to the encrypter 204.

The encrypter 204 encrypts, in step E10, the inter-coded image frames of the second encoded sequence 208 to produce an encrypted and encoded second sequence 209 which is forwarded to the interleaver 205. Specifically, the encrypter 204 encodes the payload of the inter-coded image frames, i.e., the encoded data carried by these frames. For this purpose, any known encryption scheme may be used. For example, a symmetric encryption algorithm such as AES256 or similar may be used. As the inter-coded frames of the second encoded sequence 208 only includes information about the one or more objects which are privacy masked in the first encoded sequence 207, the encryption implies that only the one or more objects are encrypted. The encrypted second encoded sequence 209 is illustrated by means of a sequence of boxes with dashed pattern at the bottom of the encryption block 204. As shown in FIG. 2, the encryption is advantageously made after the encoding. Otherwise, there is a risk that the encoding damages the encryption.

The interleaver 205, in step E12, merges the first and the second encoded sequence 207, 209 to produce the single output sequence 117 of encoded frames. In order to do so, the interleaver 205 interleaves the frames of the first and the second encoded sequence 207, 209. For example, and as illustrated in the interleaver block 205, the interleaver 205 may alternately include frames from the first 207 and the second 209 encoded sequence in the output sequence 117. It is understood that steps E10 and E12 may be carried out in the reverse order. In other words, the inter-coded frames stemming from the second encoded sequence may be encrypted after they have been interleaved with the frames of the first encoded sequence.

The inter-coded frames of the second encoded sequence 209 may be hidden in the output sequence 117 such that the standardized decoding device 121 disregards these frames. In order to hide the frames, the encoder 203 may provide the image frames of the second encoded sequence 208 with an indication which prevents them from being decoded by the standardized decoding device 121. The indication may be any type of indication which causes a standardized decoding device 121 to disregard the concerned frames. The indication may be provided in headers of the inter-coded image frames of the second encoded sequence. In more detail, the coded video data, i.e., the intra-coded and inter-coded image frames, may be organized in NAL units in the output sequence 117. In the H.264 and H.265 standards, the NAL units are provided with header information which includes the type of data in the NAL unit. The header information is followed by payload data of the type specified by the header. For example, if the NAL unit carries data of an intra-coded frame, the header information may specify that the data is an intra-coded frame. The indication may be provided by setting a value of the NAL, unit type of NAL units associated with the inter-coded image frames of the second encoded sequence. The value may be set to indicate that the NAL units should not be decoded by a standardized decoder. More specifically, five bits, which gives 32 possible values, may be set to indicate the type of the NAL unit according to H.264. Some of these values—the value 0 or values in the range 24-31—are unspecified in the standard and do not affect the decoding process. Thus, by setting the NAL unit type to one of these values, the standardized decoder 121 will automatically disregard the inter-coded image frames associated with these NAL units. A customized decoder may however be specifically designed to identify these inter-coded frames based on the indication as will be explained in more detail below.

In some embodiments, the encoder 203 may set the intra-coded frames of the first encoded sequence 207 to non-display frames as supported by the H.265 standard. This implies that neither the standardized decoder 121 nor the customized decoder 122 will include decoded versions of the intra-coded frames in the decoded output sequences 124, 125 which are sent to the display 123. However, since it may be desirable that the standardized decoding device 121 still displays the contents of the intra-coded frames, the encoder 203 may add an empty inter-coded frame after each intra-coded image frame in the first encoded sequence 207. Such an empty frame may be implemented as P-skip frame. The empty frame may be provided with the same time stamp as the preceding intra-coded frame.

Figure 4:
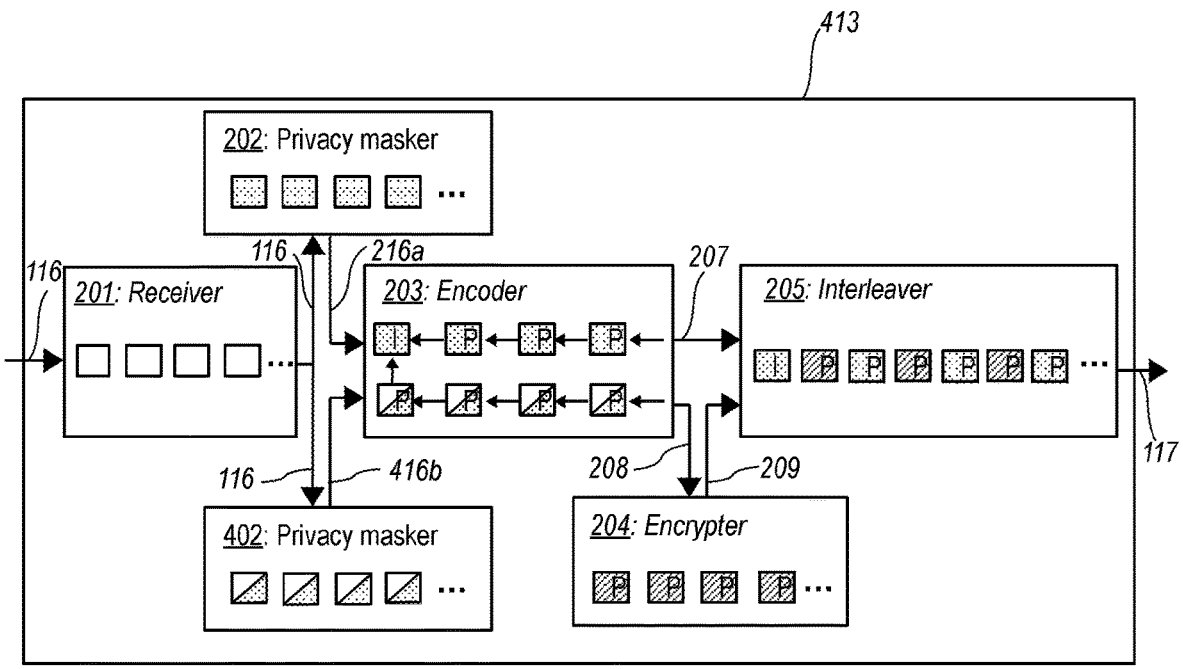
FIG. 4 schematically illustrates an encoding device according to further embodiments.

FIG. 4 illustrates an alternative embodiment which may be useful when there are different types of objects in the scene whose privacy is to be detected. The encoding device 413 shown in FIG. 4 differs from that of FIG. 2 in that the encoding device 413 includes a privacy masker 402 which generates a second version 416b of the sequence of image frames. The privacy masker 402 operates similarly to the privacy masker 202 and provides image frames of the second version 416b of the sequence of image frames with privacy masks. However, while the privacy masker 202 protects all of the different types of objects in the image frames of the first version 216a with privacy masks, the privacy masker 402 refrains from providing a first type of objects with privacy masks. Accordingly, all but the first type of objects are concealed in the image frames of the second version 416b of the sequence which is output of the privacy masker 402. This is illustrated by the sequence of boxes in the privacy mask block 402 that are partly filled with a dotted pattern.

Figure 5:
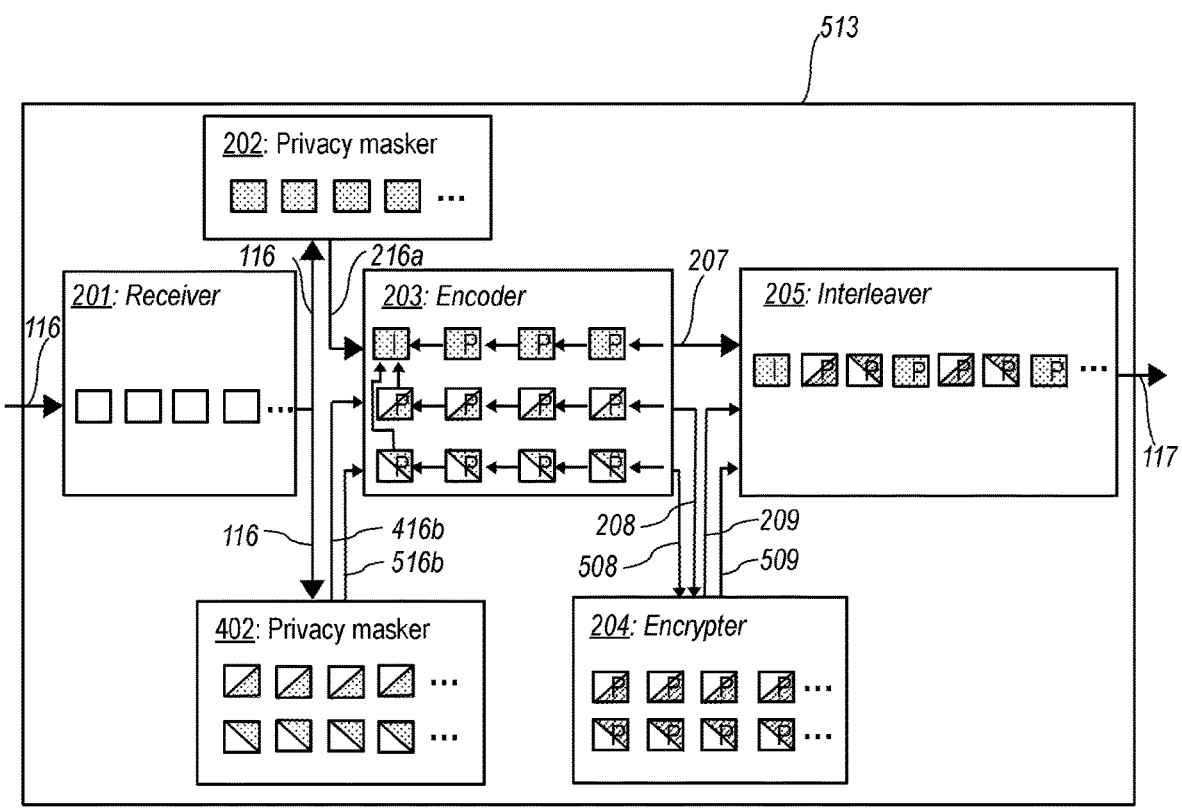
FIG. 5 schematically illustrates an encoding device according to still further embodiments.

FIG. 5 illustrates yet an alternative embodiment on the same theme. The encoding device 513 of FIG. 5 differs from the encoding device 413 of FIG. 4 in that the privacy masker 402 further generates a third version 516b of the sequence of image frame. The privacy masker 402 provides image frames of the third version 516b of the sequence with privacy masks. In more detail, the privacy masker conceals all but a second type of objects with privacy masks. Hence different types of objects are visible in the second version 416b and the third version 516b which are output of the privacy masker 402. The encoding device 513 otherwise handles the third version 516b in the same way as the second version 416b. Accordingly, in the resulting output stream 117 encoded frames of the first encoded sequence 207, a second encoded sequence 209, and a third encoded sequence 509 are alternated.

It is understood that the FIG. 5 embodiment generalises to the case where more than three versions of the image sequence are generated, where different types of objects are masked in different ones of the second version, third version, fourth version, etc. It is also understood that there are embodiments in which different numbers of object types are masked in different versions of the sequence of images. In the first version, all object types are masked, in the second version, all but one object types are masked, in the third version, all but two object types are masked, etc.

Figure 6:
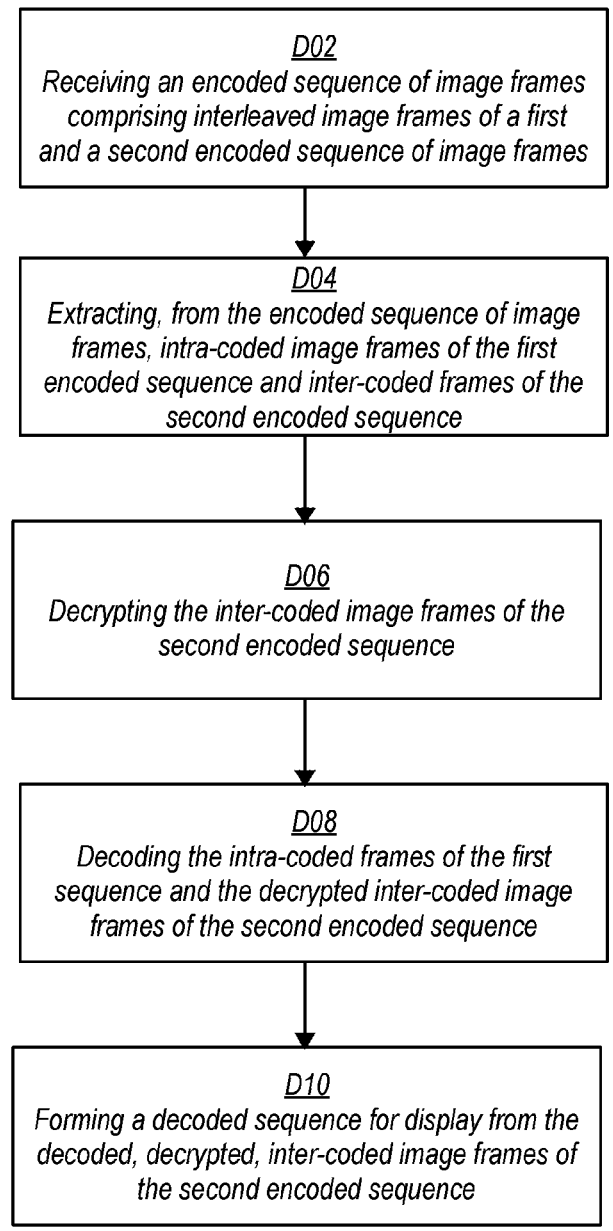
FIG. 6 is a flowchart of a decoding method according to embodiments
Figure 7:
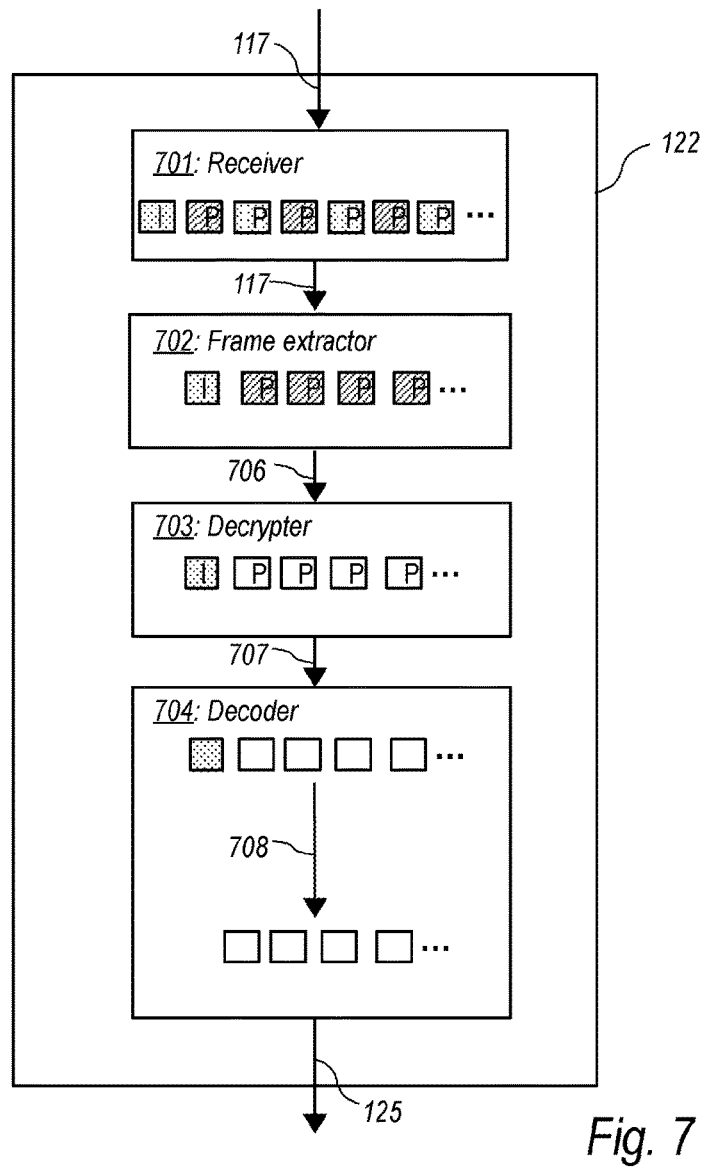
FIG. 7 schematically illustrates a customized decoding device according to embodiments.

The operation of the customized decoding device 122 will now be described with reference to the flow chart of FIG. 6 and to FIG. 7 which shows the customized decoding device 122 in more detail. Similar to the encoding device 113, the different components 701, 702, 703, 704, 705 of the decoding device 122 may be implemented in software and/or hardware as explained above in conjunction with FIG. 2.

In step D02, the receiver 701 of the decoding device 122 receives the encoded sequence of image frames 117 produced by the encoding device 113. The encoded sequence of image frames 117 is forwarded to a frame extractor 702.

The frame extractor 702, in step D04, extracts the intra-coded frames of the first encoded sequence 207, and the inter-coded frames of the second encoded sequence 209. In other words, the frame extractor 702 extracts those frames which are needed to reconstruct the second version 216b of the received sequence of image frames (or the second and third versions 416b, 516b in the embodiments of FIGS. 4 and 5). In the situation illustrated in FIG. 5 where the encoded sequence of image frames 117 also includes inter-coded image frames of further encoded sequences 509, the frame extractor 702 extracts those inter-coded frames as well.

When extracting frames from the encoded sequence of image frames 117, the frame extractor 702 may make use of header information which specifies the type of the frame. The header information may specify whether a frame is an intra-coded frame or an inter-coded frame. For example, the type of the frame may be signalled via the NAL unit type. Accordingly, the frame extractor 702 may extract all frames which are specified to be intra-coded frames. In order to distinguish the inter-coded frames of the second encoded sequence 209 from those of the first encoded sequence 207, the frame extractor 702 may use the indication described above which indicates that a frame should not be decoded by a standardized decoder 121. Specifically, the frame extractor 702 may identify inter-coded frames which includes such an indication and extract them from the sequence 117.

The extracted frames 706 are forwarded to the decrypter 703. The decrypter 703, in step D06, decrypts the payload of the extracted inter-coded frames. Notably, this requires that the decrypter 703 is provided with a decryption key which matches the encryption key used by the encrypter 204 of the encoding device 113. Thus, only users in possession of that decryption key may decrypt the inter-coded frames.

Next, the decoder 704 in step D08 proceeds to decode the sequence 707 of intra-coded frames and decrypted inter-coded frames. The decoder 704 may in this respect operate as a standard H.264 or the H.265 decoder. The decoder 704 thus produces a sequence of decoded frames 708. In some of the decoded frames 708, corresponding to the intra-coded frames, there are privacy masks which protects the privacy of objects, while in others, corresponding to the inter-coded frames, at least one type of objects is not provided with privacy masks. Since only the latter frames, i.e., the frames without privacy masks, should be displayed, the decoder 704, in step D10, forms a display sequence 125 which only includes the frames corresponding to the decrypted, decoded, inter-coded frames. Thus, in the final display sequence 125 the one or more objects are visible.

Typically, the frames of the sequence 707 of intra-coded frames and inter-coded frames are associated with time stamps. The time stamps indicate points in time when the frames are to be displayed. These time stamps are preferably adjusted so as to compensate for the non-inclusion of frames corresponding to the intra-coded frames in the display sequence 125. Without such an adjustment there would be a jump around the time point of the intra-coded frame when the display sequence 125 is play backed. This may be achieved by shifting and stretching the time stamps of the inter-coded frames temporally. Specifically, the time stamps of the inter-coded frames may be temporally interpolated such that they are uniformly distributed over time. By way of example, suppose that the sequence 707 includes frames with time stamps according to the following:

Frames: I P P P I P P P

Time stamps: 0 1 2 3 4 5 6 7 (next 8)

When the intra-coded frames are removed, the time stamps may be shifted and stretched according to:

Frames: P P P P P P

Adjusted time stamps: 0 1.3 2.7 4 5.3 6.7 (next 8)

Accordingly, the time stamp of the first inter-coded frame of a GOP may be shifted in time such that it is given the time stamp of the intra-coded frame starting the GOP. The time stamps of the other inter-coded frames of the GOP may be interpolated such that they are uniformly distributed over the time interval spanned by the time stamps of the intra-coded frame starting the GOP and the intra-coded frame of the next GOP.

Figure 8:
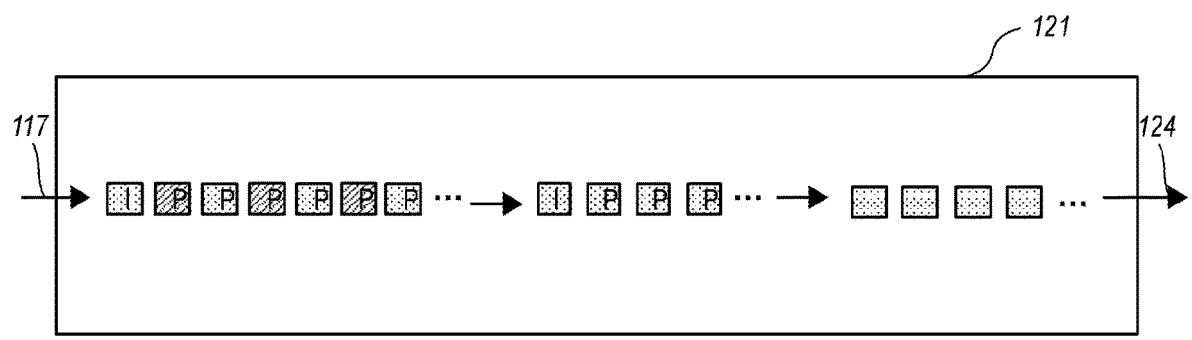
FIG. 8 schematically illustrates the operation of a standardized decoding device.

FIG. 8 illustrates how the standardized decoder 121 would handle the encoded sequence of images 117. The standardized decoder 121 receives the encoded sequence of images 117. When reading the received sequence 117, the standardized decoder 121 disregards the inter-coded frames corresponding to the second encoded sequence (the dashed frames in FIG. 8). Specifically, the standardized decoder 121 disregards these frames due to the indication that these frames should not be decoded by a standardized decoder.

Accordingly, the standardized decoder 121 proceeds to decode the frames corresponding to the first encoded sequence 207 and will hence produce a display sequence 124 which corresponds to the privacy masked first version 216*b* of the original image sequence. Thus, in the display sequence 124 the one or more objects are protected by privacy masks.

It will be appreciated that a person skilled in the art can modify the above-described embodiments in many ways and still use the advantages as shown in the embodiments above. Thus, the embodiments should not be limited to the shown embodiments but should only be defined by the appended claims. Additionally, as the skilled person understands, the shown embodiments may be combined.

The invention claimed is:

1. A method for encoding a sequence of image frames depicting an object whose privacy is to be protected, comprising:
   receiving a sequence of image frames to be encoded, wherein the sequence of image frames depicts different types of objects whose privacy is to be protected;
   generating a first and a second version of the sequence of image frames,
   wherein, when generating the first version of the sequence of image frames, the image frames of the first version are provided with privacy masks to protect the privacy of all types of objects whose privacy is to be protected;
   encoding the first version of the sequence of image frames as a first encoded sequence of intra-coded image frames and inter-coded image frames;
   encoding the second version of the sequence of image frames as a second encoded sequence of inter-coded image frames, wherein the inter-coded image frames of the second encoded sequence are encoded by using the intra-coded image frames of the first encoded sequence;
   encrypting the inter-coded image frames of the second encoded sequence; and
   merging the first and the second encoded sequence into a single output sequence by interleaving image frames of the first and the second encoded sequence
   wherein when generating the second version of the sequence of image frames, the image frames of the second version of the sequence are provided with privacy masks to protect the privacy of all but a first type of objects whose privacy is to be protected.

2. The method of claim 1, further comprising:
   providing the inter-coded image frames of the second encoded sequence with an indication which prevents them from being decoded by a standardized image decoder.

3. The method of claim 2, wherein the indication is provided in headers of the inter-coded image frames of the second encoded sequence.

4. The method of claim 2, wherein the indication is provided by setting a value of a network abstraction layer, NAL, unit type of NAL units associated with the inter-coded image frames of the second encoded sequence, wherein the value indicates that the NAL units should not be decoded by a standardized decoder.

5. The method of claim 1, further comprising:
   providing the intra-coded image frames of the first encoded sequence with an indication that they should not be displayed; and
   adding, to the first encoded sequence, a P-skip frame after each of the intra-coded image frames.

6. The method of claim 5, further comprising:
   generating a third version of the sequence of image frames, wherein the image frames of the third version of the sequence are provided with privacy masks to protect the privacy of all but a second type of objects whose privacy is to be protected;
   encoding the third version of the sequence of image frames as a third encoded sequence of inter-coded image frames, wherein the inter-coded image frames of the third encoded sequence are encoded by using the intra-coded image frames of the first encoded sequence, encrypting the inter-coded image frames of the third encoded sequence; and
   merging the third encoded sequence with the first and the second encoded sequence into the single output sequence by interleaving image frames of the first, the second, and the third encoded sequence.

7. The method of claim 1, wherein the second encoded sequence comprises a sub-sequence of successive interceded image frames which are encoded by using an intra-coded image frame of the first encoded sequence as a starting point for the encoding.

8. A device for encoding a sequence of image frames depicting an object whose privacy is to be protected, comprising:
   a receiver configured to receive a sequence of image frames to be encoded, wherein the sequence of image frames depicts different types of objects whose privacy is to be protected;
   a first privacy masker configured to generate a first version of the sequence of image frames, wherein the first privacy masker, when generating the image frames of the first version, is configured to provide the image frames of the first version of the sequence with privacy masks to protect the privacy of all different types of objects whose privacy is to be protected;
   an encoder configured to encode the first version of the sequence of image frames as a first encoded sequence of intra-coded image frames and inter-coded image frames, and to encode a second version of the sequence of image frames as a second encoded sequence of inter-coded image frames, wherein the inter-coded image frames of the second encoded sequence are encoded by using the intra-coded image frames of the first encoded sequence;
   an encrypter configured to encrypt the inter-coded frames of the second encoded sequence; and
   an interleaver configured to merge the first and the second encoded sequence into a single output sequence by interleaving image frames of the first encoded sequence and the second encoded sequence;
   wherein a second privacy masker configured to generate the second version of the sequence of image frames, wherein the second privacy masker, when generating the image frames of the second version, is configured to provide the image frames of the second version with privacy masks to protect the privacy of all but a first type of objects whose privacy is to be protected.

9. A camera comprising:
   an image sensor configured to capture a sequence of image frames depicting an object whose privacy is to be protected;
   a receiver configured to receive the sequence of image frames to be encoded, wherein the sequence of image frames depicts different types of objects whose privacy is to be protected;
   a first privacy masker configured to generate a first version of the sequence of image frames, wherein the first privacy masker, when generating the image frames of the first version, is configured to provide the image frames of the first version of the sequence with privacy masks to protect the privacy of all different types of objects whose privacy is to be protected;

an encoder configured to encode the first version of the sequence of image frames as a first encoded sequence of intra-coded image frames and inter-coded image frames, and to encode a second version of the sequence of image frames as a second encoded sequence of inter-coded image frames, wherein the inter-coded image frames of the second encoded sequence are encoded by using the intra-coded image frames of the first encoded sequence;

an encrypter configured to encrypt the inter-coded frames of the second encoded sequence; and an interleaver configured to merge the first and the second encoded sequence into a single output sequence by interleaving image frames of the first encoded sequence and the second encoded sequence;

wherein a second privacy masker configured to generate the second version of the sequence of image frames, wherein the second privacy masker, when generating the image frames of the second version, is configured to provide the image frames of the second version with privacy masks to protect the privacy of all but a first type of objects whose privacy is to be protected.

10. A computer readable medium having computer code instructions stored thereon which, when executed by a processor, are adapted to carry out the following method for encoding a sequence of image frames depicting an object whose privacy is to be protected, comprising:

receiving a sequence of image frames to be encoded, wherein the sequence of image frames depicts different types of objects whose privacy is to be protected;

generating a first and a second version of the sequence of image frames, wherein, when generating the first version of the sequence of image frames, the image frames of the first version are provided with privacy masks to protect the privacy of all types of objects whose privacy is to be protected;

encoding the first version of the sequence of image frames as a first encoded sequence of intra-coded image frames and inter-coded image frames;

encoding the second version of the sequence of image frames as a second encoded sequence of inter-coded image frames, wherein the inter-coded image frames of the second encoded sequence are encoded by using the intra-coded image frames of the first encoded sequence;

encrypting the inter-coded image frames of the second encoded sequence; and merging the first and the second encoded sequence into a single output sequence by interleaving image frames of the first and the second encoded sequence wherein when generating the second version of the sequence of image frames, the image frames of the second version of the sequence are provided with privacy masks to protect the privacy of all but a first type of objects whose privacy is to be protected.

* * * * *